SAMUEL N. GOODALE.

Improvement in Lubricators for Steam and Air Engines.

No. 120,056.   Patented Oct. 17, 1871.

Attest
Walter Allen
Wm H Brereton

Inventor
Samuel N. Goodale
By Knight Bros. Attys.

UNITED STATES PATENT OFFICE.

SAMUEL N. GOODALE, OF ST. LOUIS, MISSOURI.

IMPROVEMENT IN LUBRICATORS FOR STEAM AND AIR-ENGINES.

Specification forming part of Letters Patent No. 120,056, dated October 17, 1871.

*To all whom it may concern:*

Be it known that I, SAMUEL N. GOODALE, of the city and county of St. Louis and State of Missouri, have invented an Improved Lubricator for Pistons of Steam and Air-Engines.

My lubricator consists of a disk or short cylinder of felt or other fibrous material, supported between two metallic disks, the piston-rod passing axially through the same, so that the periphery of the felt is in contact with the cylinder. The disks of metal are held together by screw-bolts, by which the pressure upon the felt may be regulated. The felt is saturated with oil or other lubricant, and its office is to lubricate the cylinder in advance of the piston. My lubricator is primarily intended for use where the steam or compressed air acts only upon the side of the piston opposite to the rod. The lubricator may be fast upon the piston-rod, but is preferably made loose thereon, and its movement limited by a collar carrying a spring-pawl, which may act on an annular ratchet on the lubricator to cause a partial rotation of the latter as it slides upon the rod at each stroke of the piston.

Figure 1:
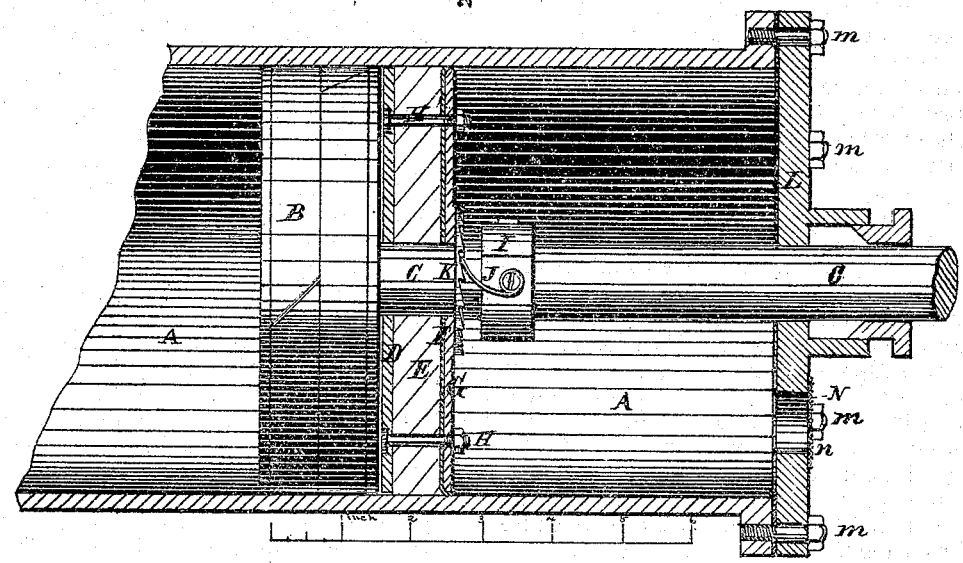
Figure 2:
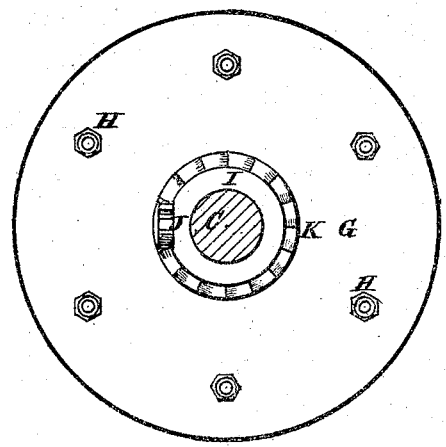

Figure 1 shows a portion of a cylinder and the lubricator in axial section, and the piston and rod in side view. Fig. 2 is an end view of the lubricator.

The drawing represents the device as applied to a single-acting piston, as stated.

A is a portion of a steam or air-cylinder; B, a piston; C, the piston-rod. D is a metallic disk made to freely fit the cylinder and the piston-rod. E is fibrous material, such as felt or any similar substance capable of sustaining a quantity of oil to lubricate the cylinder. F is a disk of rubber canvas or some similar substance to sweep the cylinder in advance of the felt. G is a disk similar to D, and held thereto by bolts H. I is a collar upon the piston-rod, so placed as to allow the lubricator to slide a certain distance on the rod to bring in action a spring-pawl, J, on the collar, which engages an annular ratchet, K, on the disk G to give a partial rotation to the lubricator at each stroke of the piston. L is the cylinder-head, secured by stud-bolts and nuts *m*, and having one or more apertures, N, protected by gauze or other material for the purpose of excluding dust from the cylinder as the air passes in on the retrograde movement of the piston. The apertures allow a free circulation of air through the cylinder-head at a distance from the piston-rod so that the dust will not gather in the stuffing-box of the same and increase the friction and wear of the parts.

The lubricator may be used in all steam and air-cylinders, whether said cylinder is provided with a head, L, or not; but in the ordinary steam-engine, where the steam acts on both sides of the piston, the described device for giving partial rotation to the lubricator at each stroke would, of course, be dispensed with, as the lubricator would have no end movement on the rod.

I claim as my invention—

1. The lubricator consisting of a fibrous material, E, supported between plates D G, all arranged substantially as and for the purpose set forth.

2. In combination with the lubricator D E G, the collar I, pawl J, and ratchet K, as and for the purpose set forth.

In testimony of which invention I hereunto set my hand.

SAMUEL N. GOODALE.

Witnesses:
 SAML. KNIGHT,
 N. B. WEED.

(87)